United States Patent
Weisgurt et al.

(10) Patent No.: US 10,655,752 B2
(45) Date of Patent: May 19, 2020

(54) INTERNAL VALVE MANIFOLD

(71) Applicant: Rosemount Inc., Shakopee, MN (US)

(72) Inventors: Mark R. Weisgurt, Savage, MN (US);
Trevor T. Stroth, Minneapolis, MN (US)

(73) Assignee: Rosemount Inc., Shakopee, MN (US)

( * ) Notice: Subject to any disclaimer, the term of this patent is extended or adjusted under 35 U.S.C. 154(b) by 0 days.

(21) Appl. No.: 15/446,476

(22) Filed: Mar. 1, 2017

(65) Prior Publication Data
US 2018/0252327 A1 Sep. 6, 2018

(51) Int. Cl.
| F16K 35/06 | (2006.01) |
|---|---|
| F16K 31/50 | (2006.01) |
| F16K 1/50 | (2006.01) |
| F16K 27/02 | (2006.01) |

(52) U.S. Cl.
CPC ............... F16K 35/06 (2013.01); F16K 1/50 (2013.01); F16K 27/0245 (2013.01); F16K 31/504 (2013.01)

(58) Field of Classification Search
CPC ..... Y10T 137/87885; Y10T 137/87901; Y10T 137/87249; Y10T 137/7062; Y10T 137/7069; F16K 31/504; F16K 35/06
USPC ....... 137/884, 886, 597, 382, 383, 363–372; 70/175–180
See application file for complete search history.

(56) References Cited

U.S. PATENT DOCUMENTS

| 1,780,242 | A | * | 11/1930 | Replogle | ................. | F16K 35/06 |
|---|---|---|---|---|---|---|
| | | | | | | 137/382 |
| 2,213,264 | A | | 9/1940 | Wall | | |
| 2,301,378 | A | * | 11/1942 | Crista | .................... | B61D 5/008 |
| | | | | | | 137/343 |
| 5,667,734 | A | * | 9/1997 | Ohgane | .................... | F02M 3/08 |
| | | | | | | 137/382 |
| 5,709,247 | A | * | 1/1998 | Hutton | ................ | F15B 13/0814 |
| | | | | | | 137/597 |
| 7,472,608 | B2 | | 1/2009 | Hedtke | | |
| 7,721,764 | B2 | | 5/2010 | Louwagle et al. | | |
| 8,282,073 | B2 | * | 10/2012 | Grewal | .................... | F16K 1/02 |
| | | | | | | 126/500 |
| 9,086,167 | B2 | | 7/2015 | Hedtke | | |
| 2012/0132840 | A1 | | 5/2012 | Shuman et al. | | |

OTHER PUBLICATIONS

International Search Report and Written Opinion, dated May 31, 2018 for International Patent Application No. PCT/US2018/018326, 12 pages.
First Chinese Office Action dated May 10, 2019 for Chinese Patent Application No. 201710280012.8, 13 pages including English translation.
Second Chinese Office Action dated dated Feb. 3, 2020 for Chinese Patent Application No. 201710280012.8, 11 pages including English translation.

* cited by examiner

*Primary Examiner* — Michael R Reid
(74) *Attorney, Agent, or Firm* — Christopher R. Christenson; Kelly, Holt & Christenson, PLLC (57) ABSTRACT

A valve manifold includes a manifold and a valve. The manifold has a recess, a first fluid port, and a second fluid port. The valve is disposed entirely within the recess and is fluidically interposed between the first fluid port and the second fluid port. The valve has a rotatable needle having an end that is configured to be displaced relative to a valve seat upon rotation.

11 Claims, 12 Drawing Sheets

PRIOR ART

FIG. 1

PRIOR ART

FIG. 2A

PRIOR ART

FIG. 2B

PRIOR ART

FIG. 2C

PRIOR ART

Additionally, some embodiments of the present invention include a dust or weather cover that can engage valve needle 106 and/or recess 102 to shield recess 102 from the ambient environment. Further, it is contemplated that a portion of handle 112 can be configured to remove such cover in any suitable manner.

While the embodiment shown in FIGS. 4A-4E depicts a single valve 100 in manifold body 104, it is expressly contemplated that multiple valves may be used with a single manifold. In such embodiments, different valves may share a particular recess 102 or may each be disposed in their own recess 102. Additionally, different valves may have different functions. In one embodiment, the key feature may be related to a valve's function such that an operator would may have different handle portions that engage different valve keys depending on valve function. In another embodiment, however, all valves may employ the same key portion.

FIG. 6

INTERNAL VALVE MANIFOLD

BACKGROUND

An industrial process transmitter generally includes a transducer or sensor that responds to a measured variable with a sensing element that converts the variable to a standardized transmission signal, e.g., an electrical or optical signal that is a function of the measured value. Industrial process pressure transmitters are used to measure pressure within industrial processes such as slurries, liquids, vapors and gases in chemical, pulp, petroleum, gas, pharmaceutical, food, and other fluid processing plants. Industrial process transmitters are often placed near the process fluids, or in field applications. Often, these field applications are subject to harsh and varying environmental conditions that provide challenges for designers of such transmitters.

Industrial process pressure transmitters are typically connected to the process to be monitored by an isolation manifold. An isolation manifold typically includes one or more valves that can be closed to isolate the process fluid pressure transmitter from the process for service (e.g., calibration) or removal of the process fluid pressure transmitter. Isolation manifolds may also include a bleed port that can be used to relieve pressure in the manifold before servicing or removal. In some instances, a bleed port will include a bleed screw or valve that is operable to open or seal the bleed port. Isolation manifolds including an isolation valve as well as a bleed port are also referred to as block and bleed manifolds.

SUMMARY

A valve manifold includes a manifold and a valve. The manifold has a recess, a first fluid port, and a second fluid port. The valve is disposed entirely within the recess and is fluidically interposed between the first fluid port and the second fluid port. The valve has a rotatable needle having an end that is configured to be displaced relative to a valve seat upon rotation.

DETAILED DESCRIPTION OF ILLUSTRATIVE EMBODIMENTS

Pressure manifolds, such as process fluid pressure manifolds, typically employ one or more valves that are external to the manifold and can be inadvertently contacted by passing personnel or equipment. Such contact may cause injury to personnel or damage the passing equipment or the valve itself. Additionally, valves with external features are also easily accessible and thus are potentially susceptible to accidental misuse or tampering.

Figure 1:
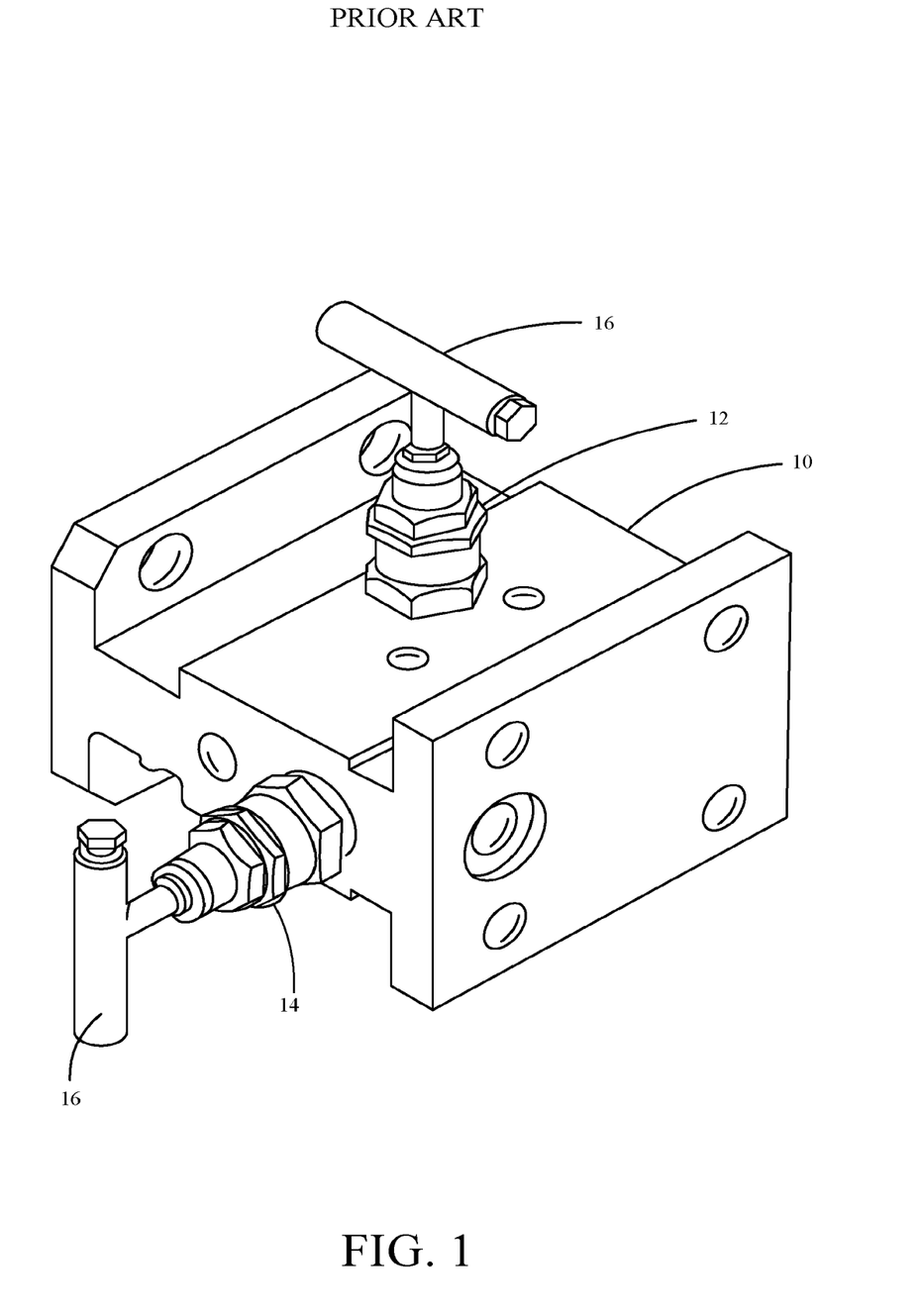
FIG. 1 is a perspective view of a manifold in accordance with the prior art.

FIG. 1 is a perspective view of a manifold and a pair of manifold valves in accordance with the prior art. As shown, manifold 10 is coupled to a pair of valves 12, 14 that selectively allow or inhibit fluid flow through manifold 10. Each of valves 12, 14 generally includes an external portion that has a handle or actuator 16 that may be grasped and turned by an operator. As set forth above, handle 16 can cause unintended contact with passing personnel or equipment. Such unintended contact can cause injury to personnel, damage the passing equipment, and/or damage the valve to which the handle 16 is attached.

Figure 2A:
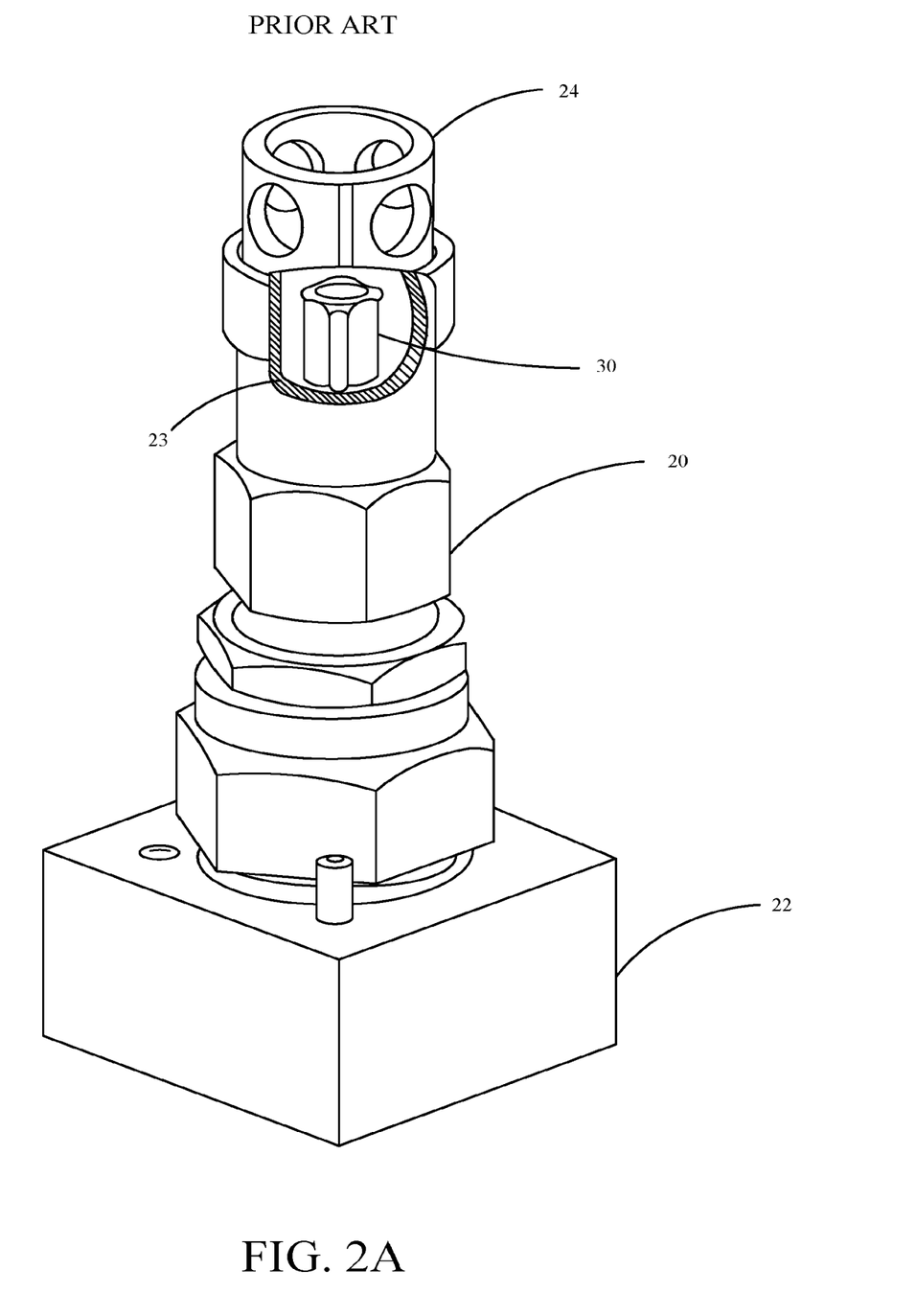
FIGS. 2A-2C are perspective views of known tamper-resistant manifold valves.
Figure 2B:
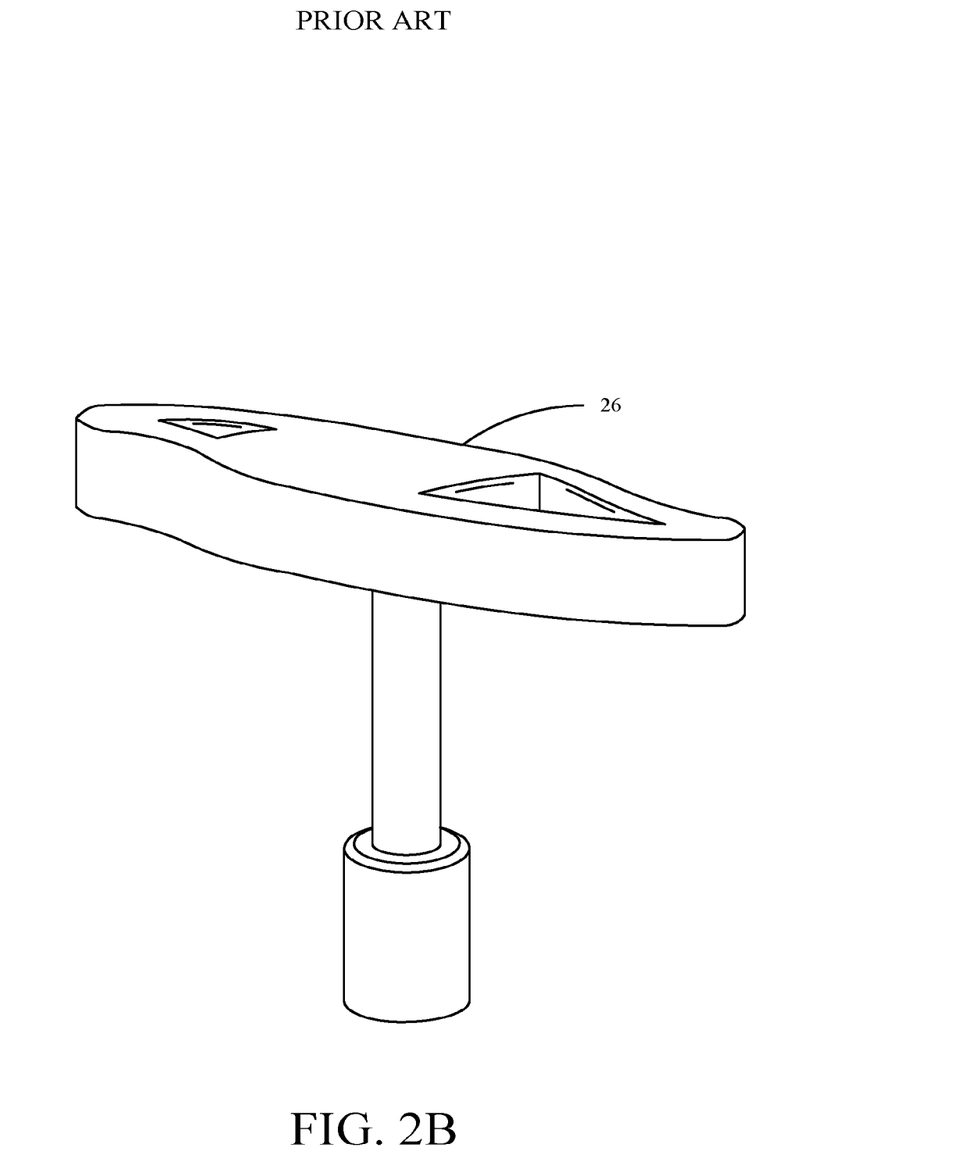
Figure 2C:
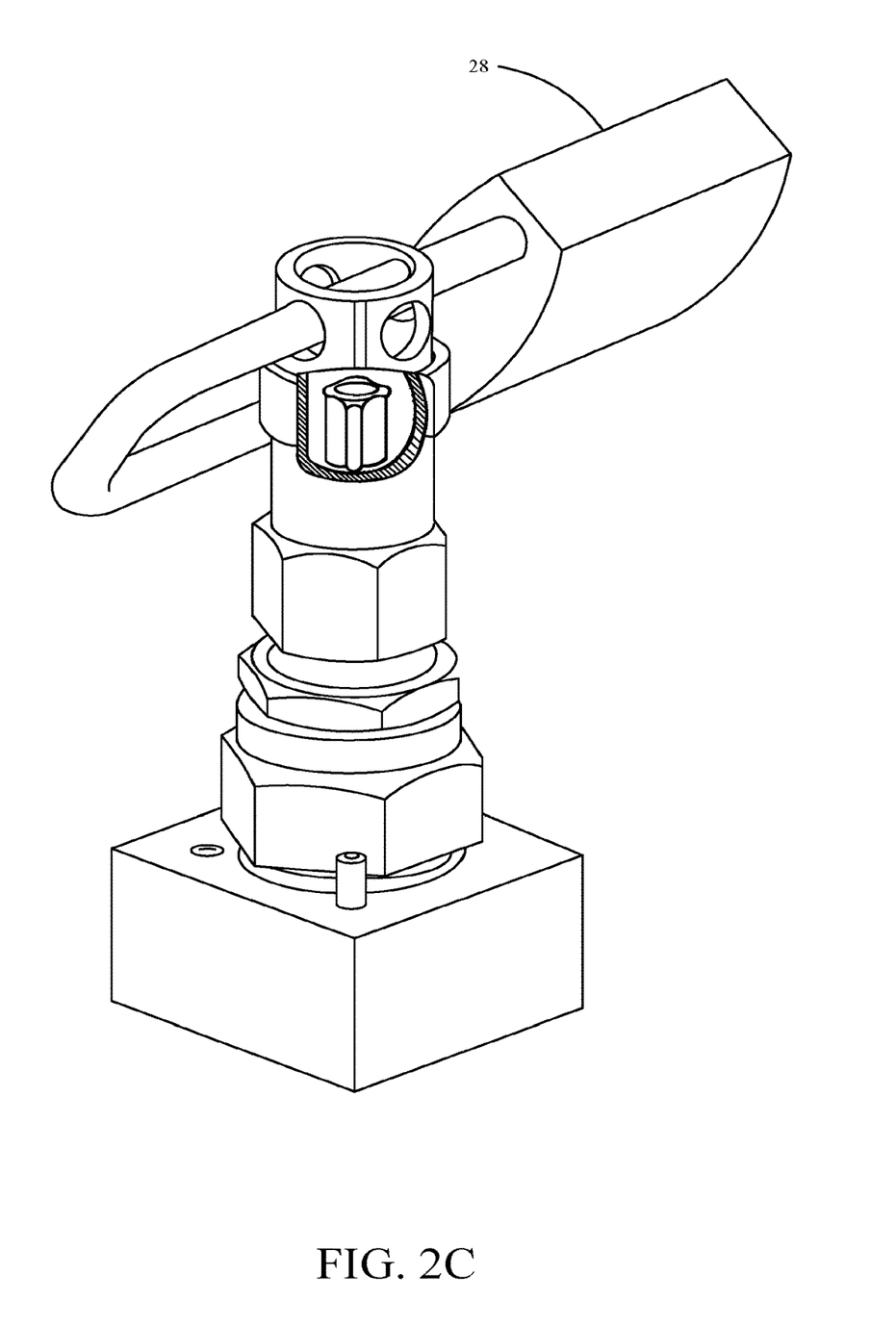

FIG. 2A is a diagrammatic view of a valve 20 coupled to a manifold 22 in accordance with the prior art. For illustration, a portion 23 of valve 20 is removed to show features inside. Valve 20 can be actuated by coupling a handle (shown in FIG. 2B) to portion 30 and rotating portion 30. When a handle is coupled to valve 20, the handle can be used by an operator, either by hand or with a suitable leverage tool to rotate portion 30 to thereby open or close valve 20. When handle 26 is not being used, it is removed from top portion 24 and a lock 28 or other suitable anti-tampering device (shown in FIG. 2C) can be engaged to top portion 24 such that handle 26 and/or other tools cannot be used to engage portion 30.

In order to provide anti-tampering features, handle 26 (shown in FIG. 2B) removably couples to portion 30. Thus, when the handle is not coupled to portion 30 (such as shown in FIG. 2A) the valve is tamper-resistant. Portion 24 is provided with a number of apertures through which an anti-tamper device (such as that shown in FIG. 2C) can be coupled.

As can be appreciated, while valve 20 provides significant anti-tampering features, it still includes a relatively substantial external portion that itself, can be impacted by passing personnel or equipment. Thus, the prior art valves described above can cause damage and/or injury due to inadvertent impacts between such valves and passing personnel or equipment. Another limitation of prior valves is that they can sometimes generate leaks.

Figure 3:
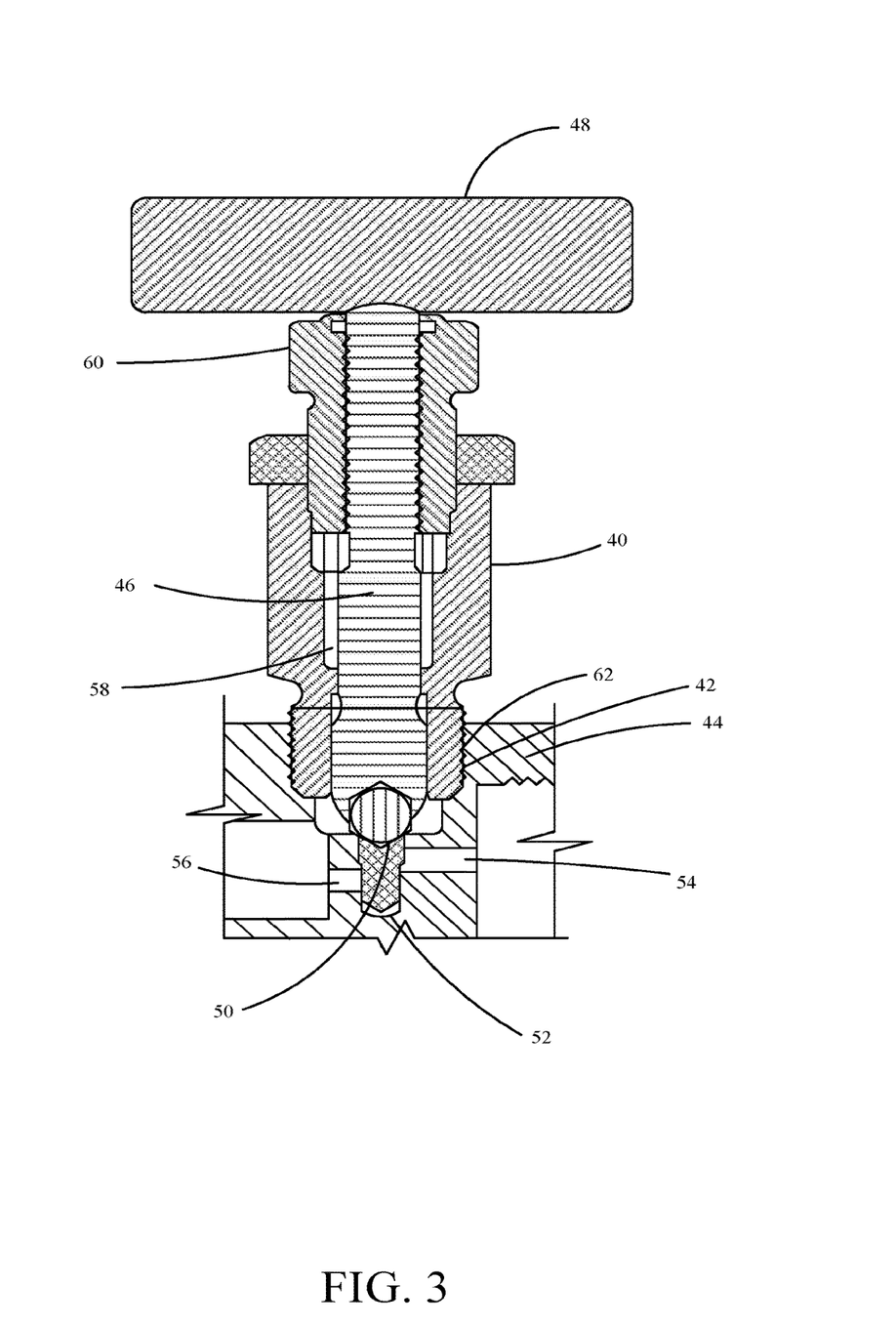
FIG. 3 is a cross-sectional view of a typical valve design used in current manifolds.

FIG. 3 is a diagrammatic cross-sectional view of a typical valve design that has a potential leak point between the bonnet and the manifold body threaded seal. As shown in FIG. 3, bonnet 40 is threadably received within internal threaded aperture 42 of manifold body 44. Valve stem 46 is rotatable via handle 48 to axially move ball tip 50 into and out of engagement with seat 52 to allow or inhibit fluid flow between ports 54 and 56. When adjusting the packing 58, jam nut 60 and the packing gland typically require a crows-foot wrench. Using a crows-foot wrench to adjust the packing can cause damage or stripping to jam nut 60 or the packing gland. In addition, there is also a risk of disturbing or damaging seal 62 between bonnet 40 and manifold body thread 42 when adjusting the packing with a crows-foot wrench.

One of the common modes for a valve assembly to leak during operation is at manifold body threaded seal 62. This threaded seal 62 is expected to hold pressure when the stem tip 50 is no longer seated in manifold body 44 (i.e. when the manifold valve is opened). If the threaded seal 62 between bonnet 40 and manifold body 44 is disturbed, then there is risk for leaks to occur when the valve assembly is under pressure.

Figure 4A:
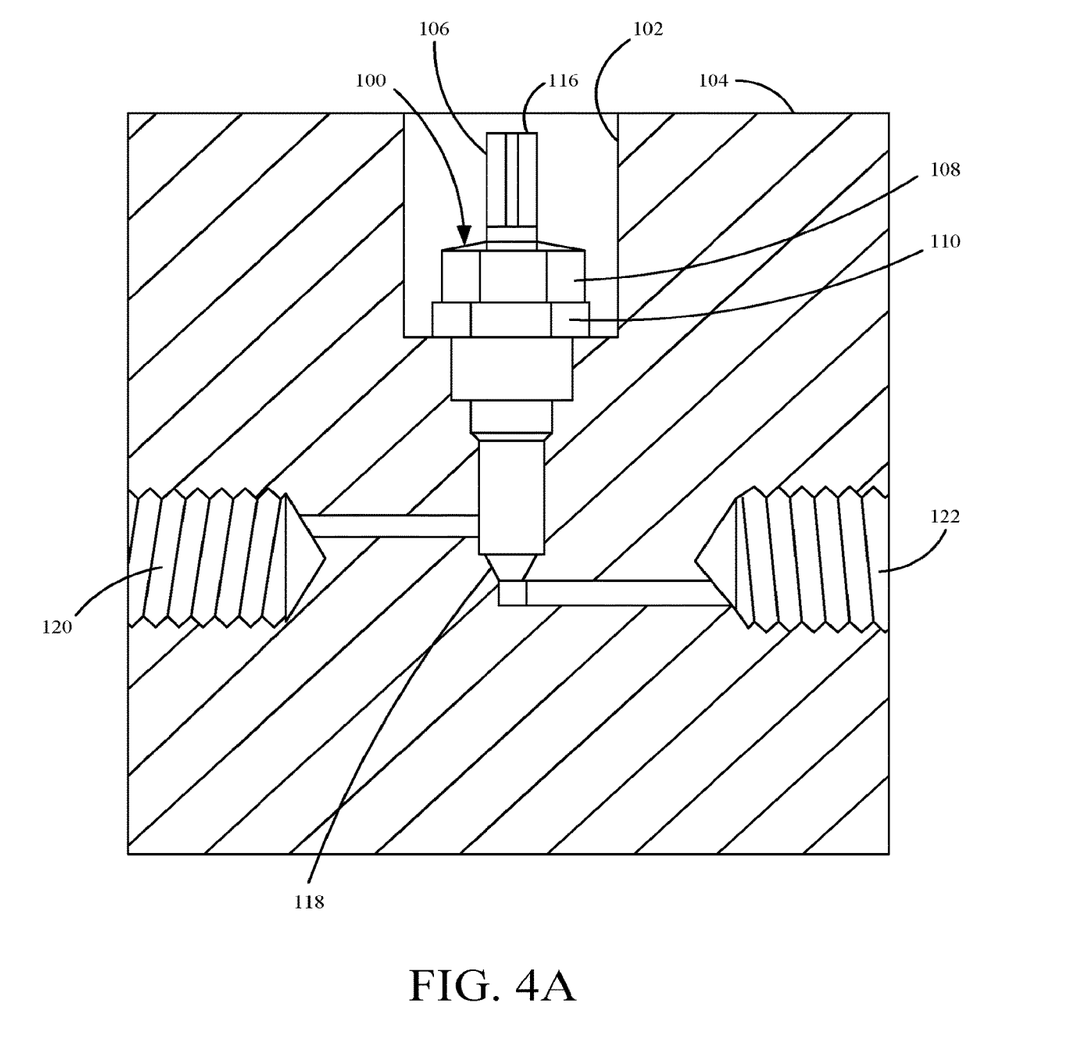
FIG. 4A is a cross-sectional view of an internal process manifold valve in accordance with an embodiment of the present invention.
Figure 4B:
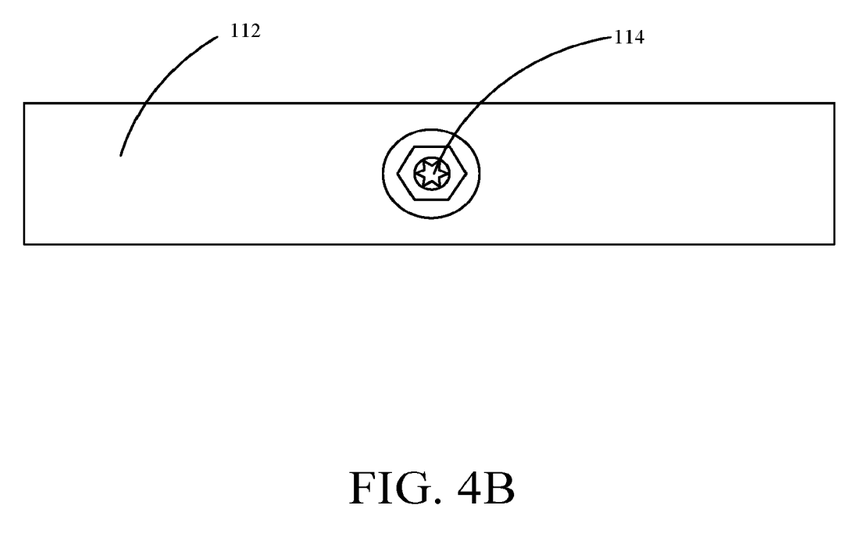
FIG. 4B is a bottom plan view of a handle having a keyed feature in accordance with an embodiment of the present invention.

FIG. 4A is a cross-sectional diagrammatic view of an internal manifold valve in accordance with an embodiment of the present invention. As shown, internal manifold valve 100 is disposed entirely within recess 102 of manifold body 104. Valve 100 includes valve needle 106, packing gland 108, jam nut 110, and keyed handle 112 (shown in FIG. 4B). Keyed handle 112 includes a proprietary keyed feature 114 that is shaped and sized to engage upper portion 116 of valve needle 106. When valve needle 106 is rotated, lower portion 118 of valve needle 106 is brought into or out of contact with the valve seat within manifold 104 thereby allowing or inhibiting fluid flow through ports 120, 122.

Figure 4C:
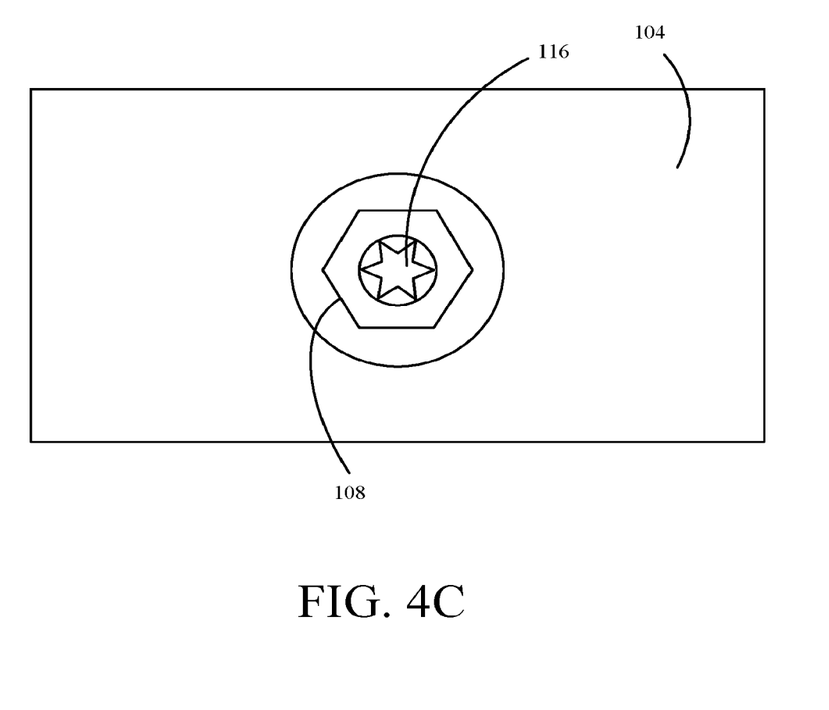
FIG. 4C is a top plan view of an internal process manifold valve in accordance with an embodiment of the present invention.
Figure 4D:
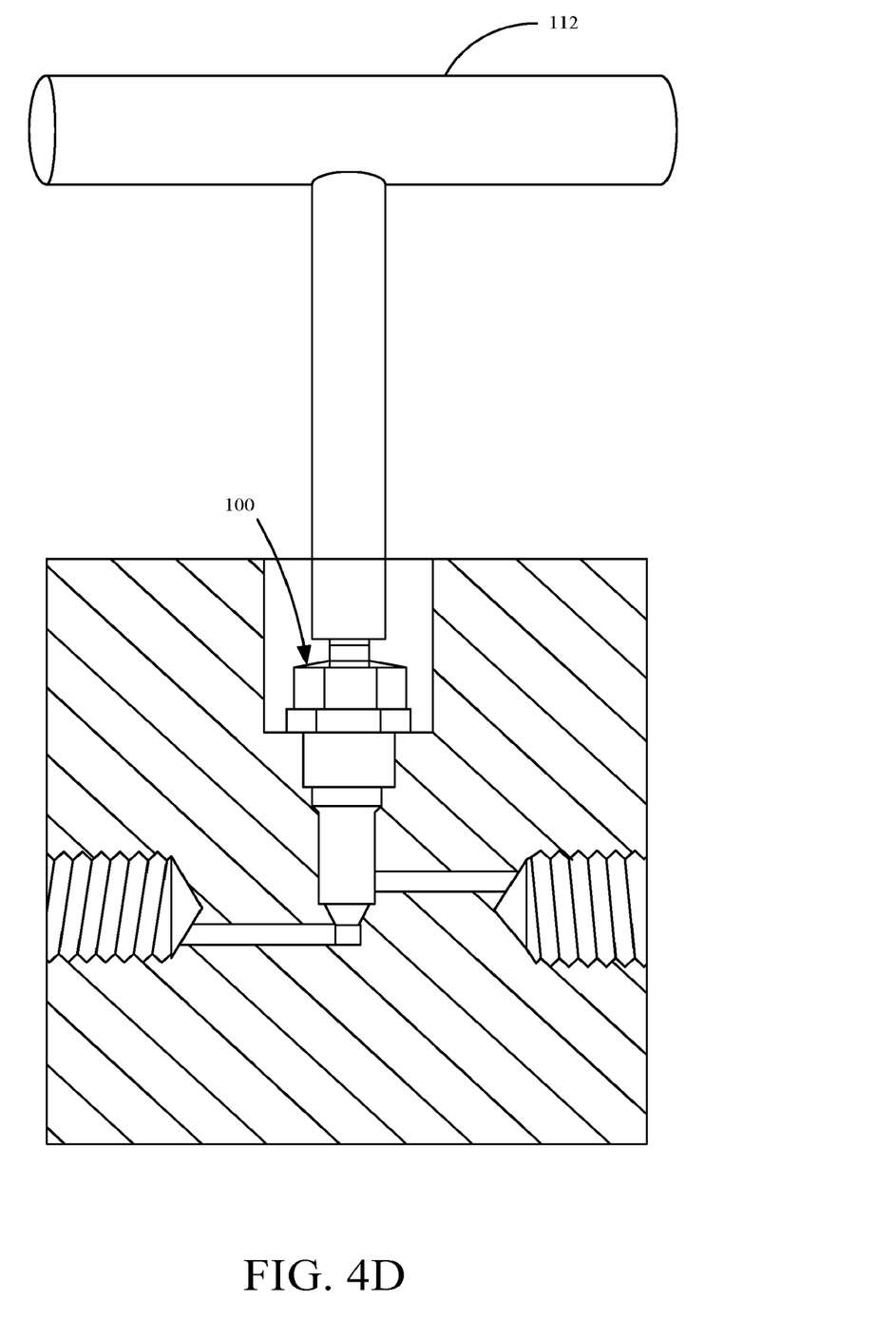
FIG. 4D is a diagrammatic view of an internal process manifold valve coupled to a handle having a keyed feature in accordance with an embodiment of the present invention.

FIG. 4C is a top plan view of an internal process manifold valve in accordance with an embodiment of the present invention. As shown in FIG. 4C, in one embodiment, keyed proprietary feature 114 of handle 112 is configured to engage portion 116 within recess 102. Accordingly, when an operator needs to adjust valve 100, he or she uses handle 112 in his/her possession to place portion 114 into contact with upper portion 116 thereby physically coupling handle 112 to valve needle 106 (as shown in FIG. 4D). Then, rotation of handle 112 allows the valve needle to be displaced. FIG. 4C also shows the hexagonal shape of packing gland 108 that can be engaged and rotated with a suitable socket wrench.

Figure 4E:
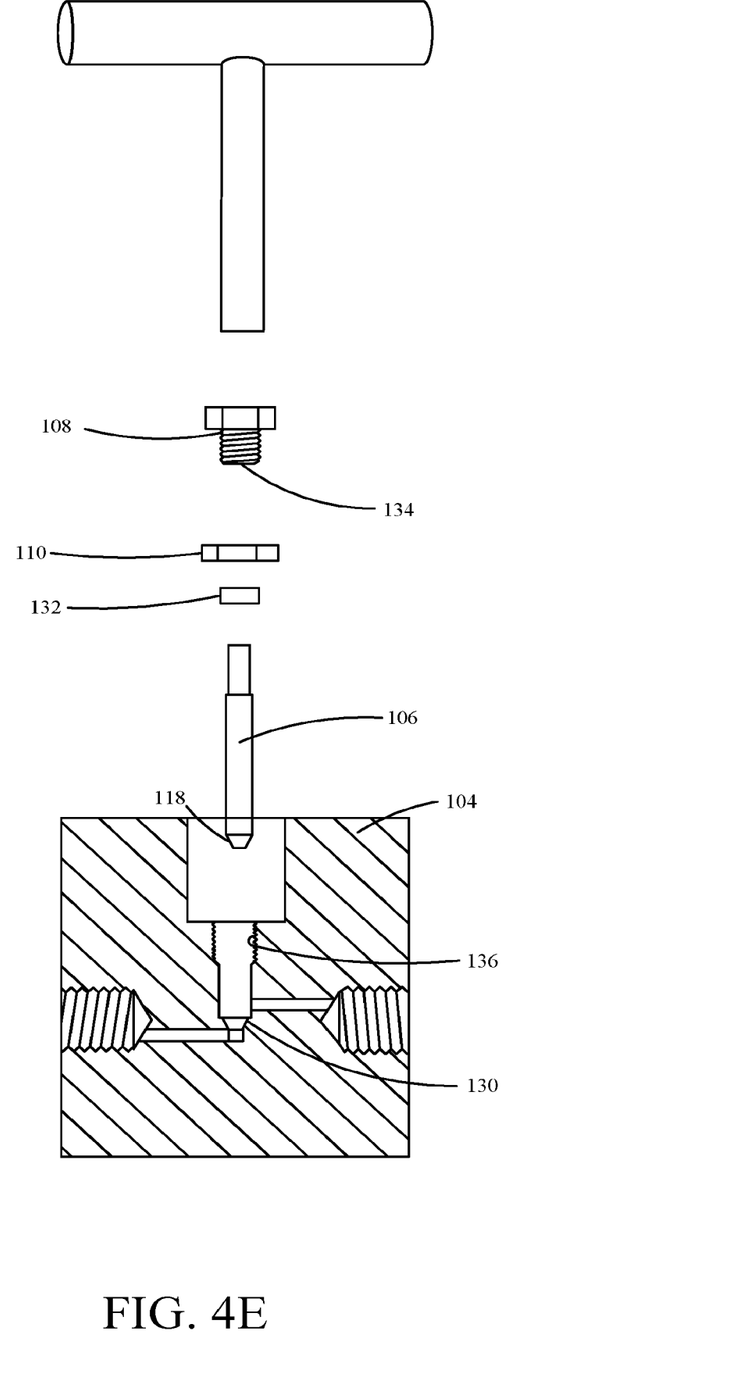
FIG. 4E is a diagrammatic exploded view of an internal process manifold valve in accordance with an embodiment of the present invention.

FIG. 4E is a diagrammatic exploded view of valve 100 in accordance with an embodiment of the present invention. As shown, valve needle 106 has a lower portion 118 that is shaped and sized to engage precisely with valve seat 130 of manifold body 104. In the embodiment shown, valve seat 130 is shaped as a conical section. However, any suitable valve seat and corresponding needle tip design and shape can be used in accordance with embodiments of the present invention. Packing 132 is configured to be disposed about valve needle 106 within manifold body 100. Packing gland 108 is configured to be threadably received within internally threaded portion 136 and surface 134 of packing gland 108 compresses packing 132. Since handle 112 can be removed from valve needle 106, it is relatively easy to place a socket wrench over packing gland 108 in order to adjust the packing. Moreover, adjustment via socket wrench is more desirable than using a crows-foot wrench because it helps reduce any damage or stripping to the adjustment jam nut or packing gland. Further, because there is no bonnet in the design shown in FIGS. 4A-4D, a potential leak path has been eliminated.

Since valve 100 is disposed within recess 102 of the valve body, there are no protruding parts that could be accidentally contacted by passing personnel or equipment. Further, removable handle 112 is also provided, in some embodiments, with a keyed feature which mates with valve needle 106. The removable handle acts as a tamper-resistant feature because the proprietary shaped "key" would be needed to operate the valves. Since the valve is internal to recess 102, the probability of accidental turning of the valve handle out in the field or tampering with the valve is reduced. Additionally, some embodiments of the present invention include a dust or weather cover that can engage valve needle 106 and/or recess 102 to shield recess 102 from the ambient environment. Further, it is contemplated that a portion of handle 112 can be configured to remove such cover in any suitable manner. While the embodiment shown in FIGS. 4A-4E depicts a single valve 100 in manifold body 104, it is expressly contemplated that multiple valves may be used with a single manifold. In such embodiments, different valves may share a particular recess 102 or may each be disposed in their own recess 102. Additionally, different valves may have different functions. In one embodiment, the key feature may be related to a valve's function such that an operator would may have different handle portions that engage different valve keys depending on valve function. In another embodiment, however, all valves may employ the same key portion.

Figure 5:
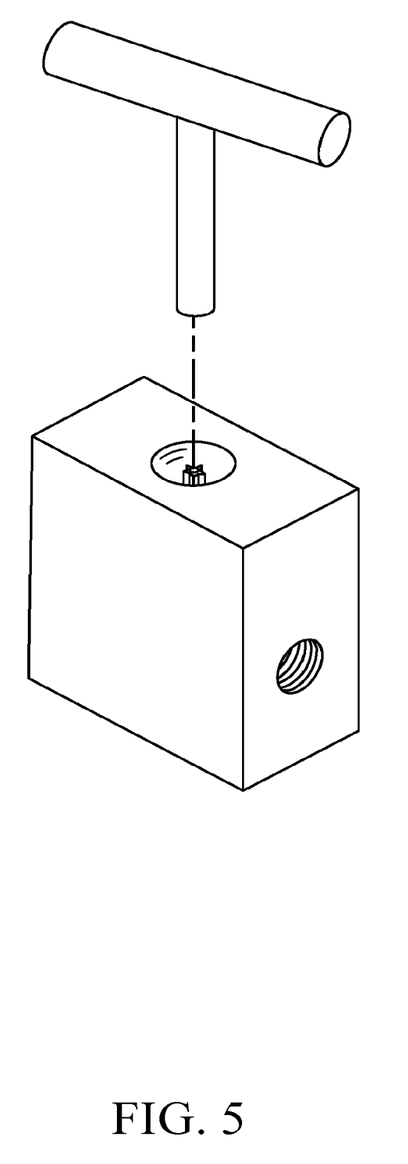
FIG. 5 is a perspective view of an internal valve having an anti-tamper feature in, accordance with an embodiment of the present invention.
Figure 6:
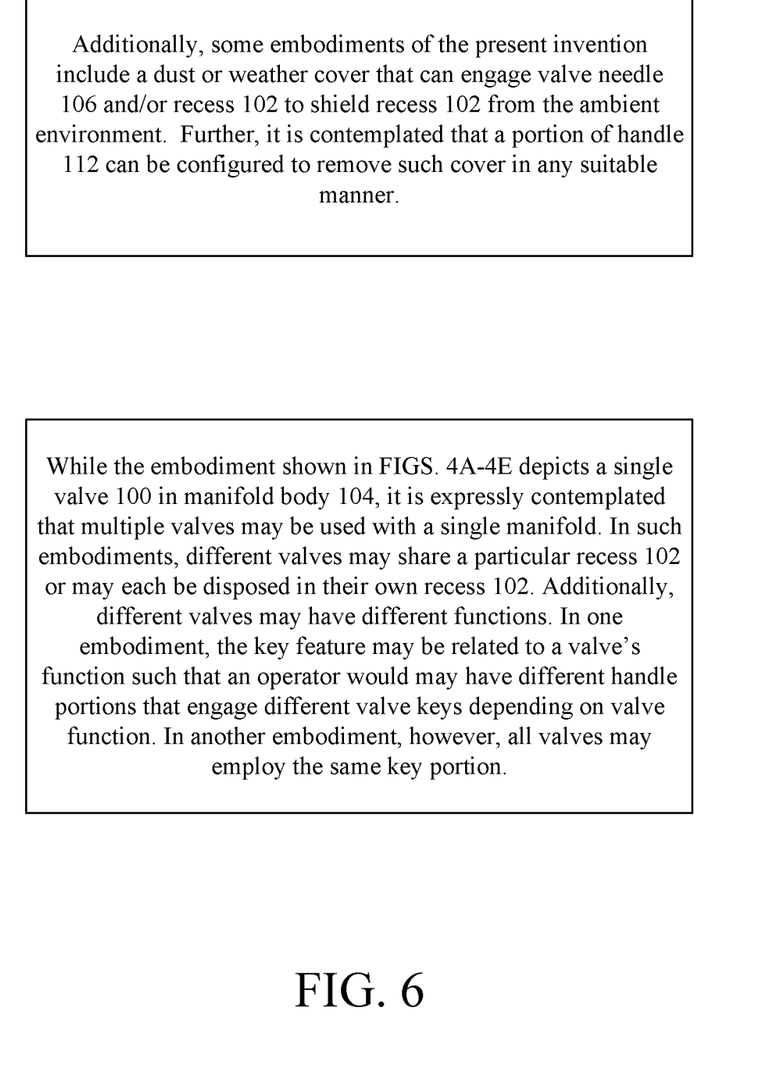
FIG. 6 provides descriptions of additional embodiments of the present invention.

FIG. 5 is a perspective view of an internal valve having anti-tamper feature in accordance with an embodiment of the present invention. As can be seen, when handle 112 is not coupled to portion 130, no part of valve 100 extends beyond surface 140 of manifold 104. In this way, the possibility of unintended contact with valve 100 is significantly reduced.

Although the present invention has been described with reference to preferred embodiments, workers skilled in the art will recognize that changes may be made in form and detail without departing from the spirit and scope of the invention.

What is claimed is:

1. A valve system, comprising:
   an isolation manifold configured to selectively isolate the process fluid pressure transmitter from the process, the isolation manifold, having a recess, a first fluid port, and a second fluid port; a valve disposed entirely within the recess and fluidically interposed between the first fluid port and the second fluid port, the valve having a rotatable needle having an end that is configured to be displaced relative to a valve seat upon rotation, wherein fluidic communication between the first fluid port and the second fluid port is inhibited when the end of the needle is engaged with the valve seat;
   a packing gland configured to be disposed within the recess and configured to be threaded into the recess of the manifold; and
   a jam nut configured to be disposed within the recess and configured to bear against the packing gland, the jam nut having a surface that is configured to be engaged by a socket.

2. The valve manifold of claim 1, wherein the rotatable needle is configured to removably couple to a handle.

3. The valve manifold of claim 2, wherein the rotatable needle has a top portion configured to engage a keyed portion of the handle.

4. The valve manifold of claim 3, wherein the keyed portion of the handle includes a female recess configured to engage a corresponding male portion of the rotatable needle.

5. The valve manifold of claim 3, wherein the keyed portion of the handle includes a male portion configured to engage a corresponding female recess of the rotatable needle.

6. The valve manifold of claim 1, and further comprising a second valve disposed within the isolation manifold.

7. The valve manifold of claim 1, and further comprising packing disposed about the rotatable needle and compressed by the packing gland.

8. The valve manifold of claim 1, and further comprising a handle removably coupled to the rotatable needle.

9. The valve manifold of claim 1, wherein the manifold has a planar surface adjacent the recess and wherein the valve needle does not break the plane of the planar surface.

10. The valve manifold of claim 1, wherein at least one of the first and second fluid ports is threaded.

11. The valve system of claim 1, wherein the socket is a hexagonal socket.

* * * * *